July 2, 1957 H. SEIDL 2,797,668
FUEL BURNING APPARATUS
Filed Sept. 29, 1952 5 Sheets-Sheet 1
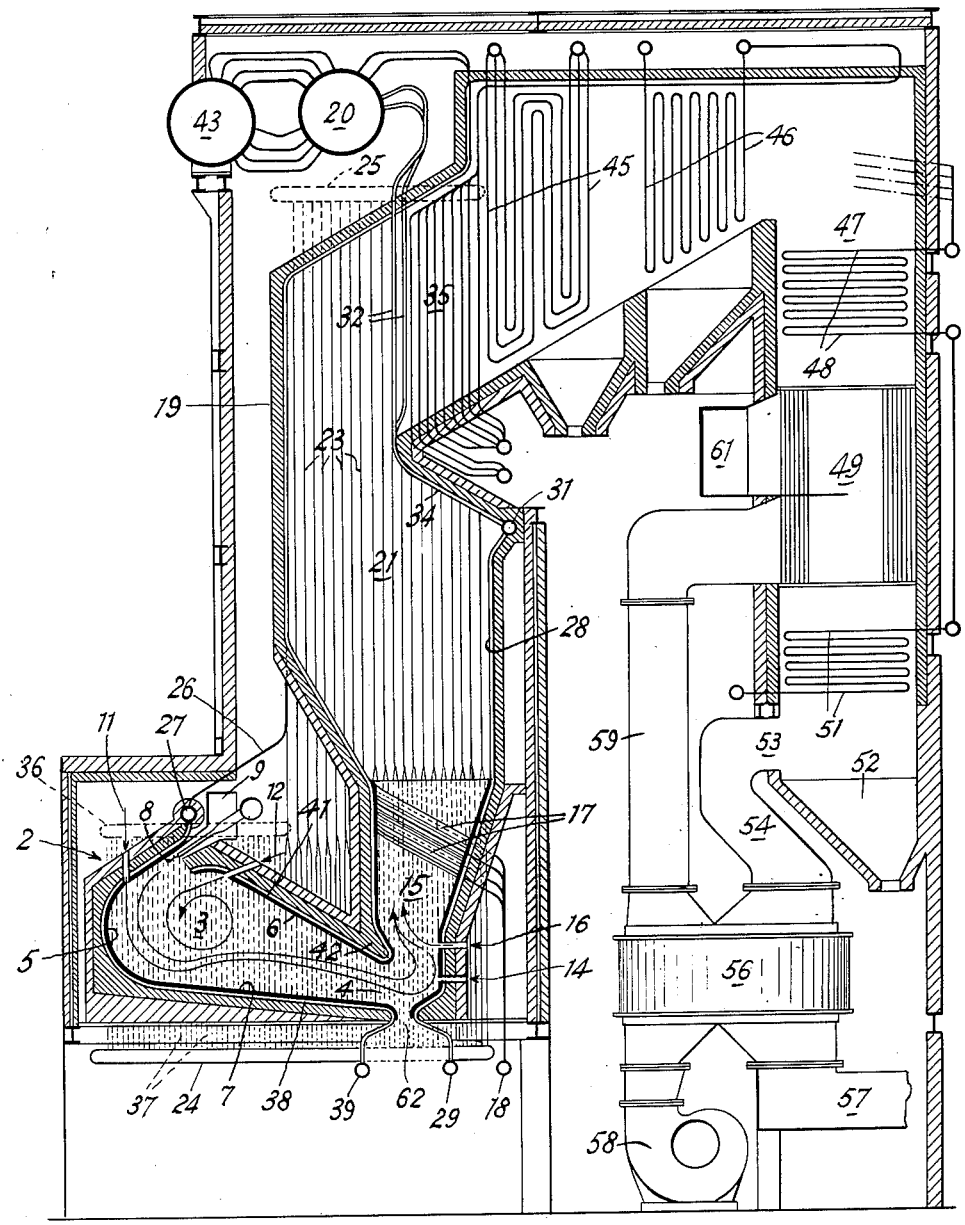
FIG. 1
INVENTOR
Herbert Seidl
BY
ATTORNEY INVENTOR
Herbert Seidl
BY
ATTORNEY July 2, 1957  H. SEIDL  2,797,668
FUEL BURNING APPARATUS
Filed Sept. 29, 1952  5 Sheets-Sheet 4
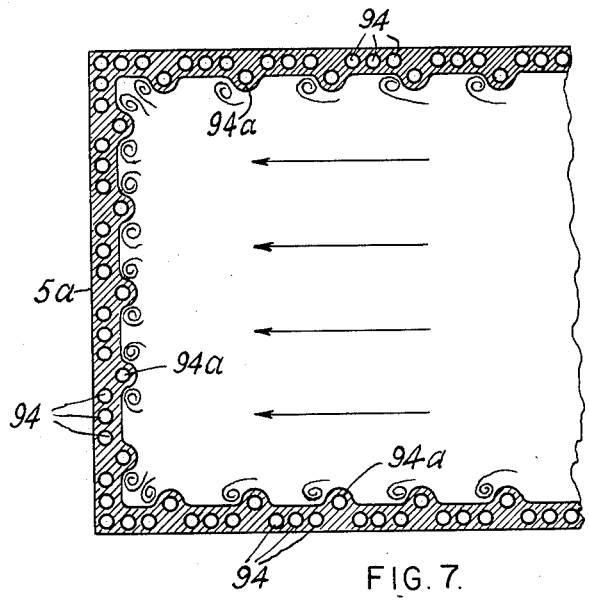
FIG. 7.
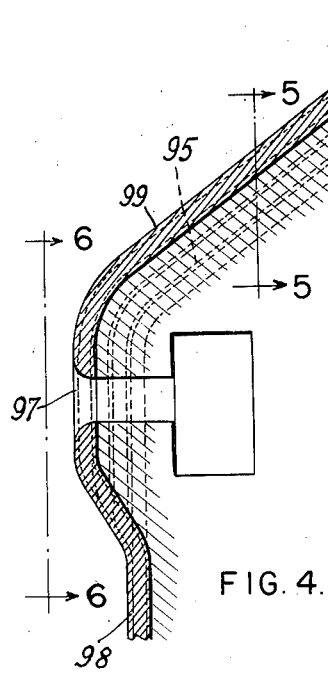
FIG. 4.
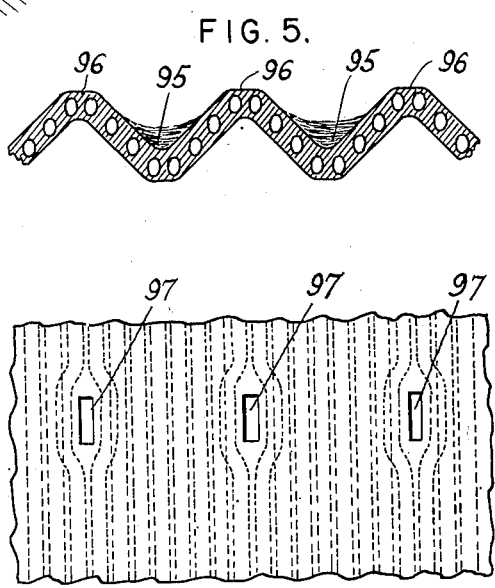
FIG. 5.
FIG. 6.
INVENTOR
*Herbert Seidl*
BY
*J. P. Moran*
ATTORNEY

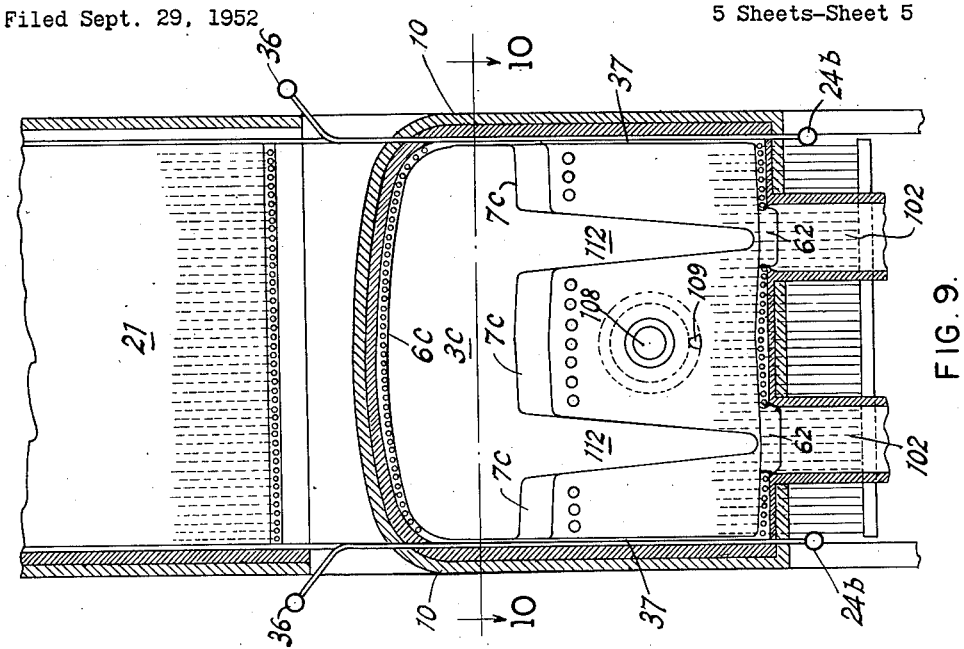
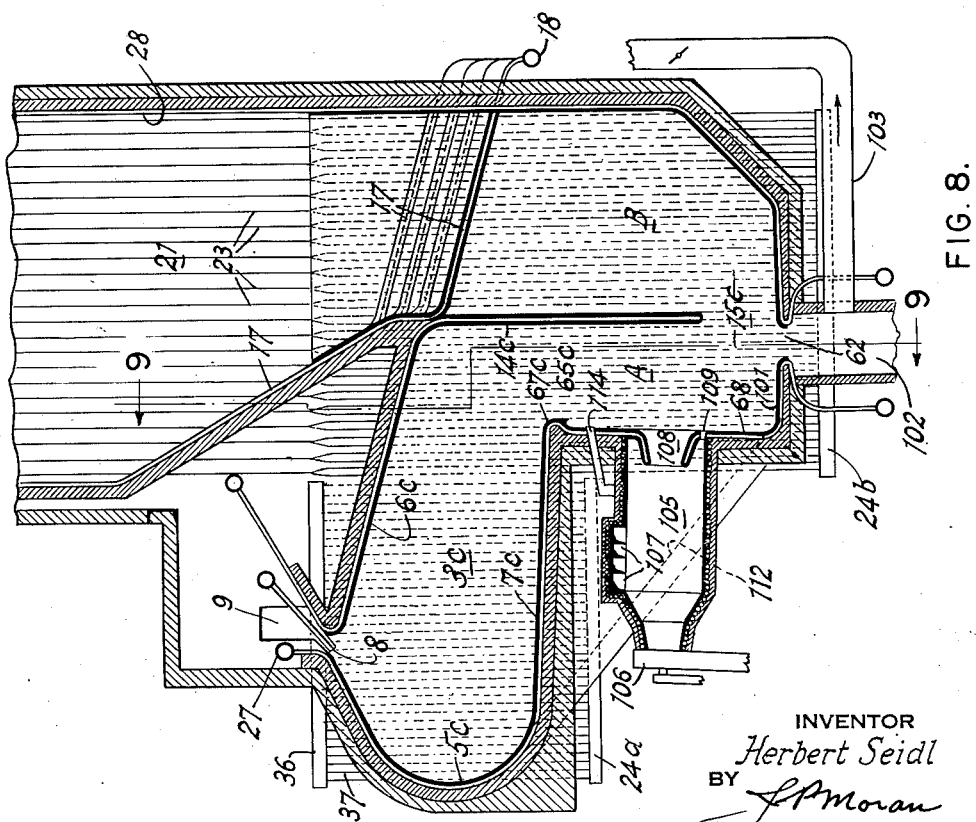

United States Patent Office 2,797,668
Patented July 2, 1957

2,797,668

FUEL BURNING APPARATUS

Herbert Seidl, Oberhausen, Germany, assignor to The Babcock & Wilcox Company, New York, N. Y., a corporation of New Jersey Application September 29, 1952, Serial No. 311,965

10 Claims. (Cl. 122—336)

The present invention relates to fluid cooled furnaces for burning slag forming fuels and especially adapted to serve as the source of heat in fuel fired vapor generating units. The combustion chambers of the respective furnaces are arranged with horizontally extending wedge shaped portions through which the heating gases are discharged and thereafter directed over a slag discharge opening through which slag originally entrained with the gases is continuously discharged from the furnace in molten condition. The gases then pass into a radiant heat absorption chamber, hereinafter termed a radiant chamber, having fluid cooled walls and having a tubular slag screen located in a lower portion thereof in the path of heating gases entering the chamber.

Heretofore, slag tap furnaces have been formed, as a general rule, with combustion chambers of trapeziform cross section in a longitudinal vertical plane, of gradually increasing height toward a radiant chamber, and with fuel burners arranged at the narrower front end. Such furnaces, of increasing cross section toward the gas outlet end, are adapted to the quantity of gas which increases as the combustion process progresses whereas, for furnaces of the type herein disclosed, the volume of the combustion chamber is fixed by the combustion chamber load required for the tapping of liquid slag. One important consideration, which is directly connected with the tapping of liquid slag, namely, that of increasing as extensively as possible the degree to which fuel ash particles are caused to be trapped in the molten slag, requires that a special form of combustion chamber be provided.

According to the invention it is proposed, therefore, to provide a combustion chamber of such form that the factors which favor the separation of ash particles from the flue gases, and the transfer of such particles to slag coated walls of the combustion chamber, are made effective. Such factors include the provision of baffles or other walls causing deflections of the flue gas stream, and also the formation of the combustion chamber walls in such manner as to be effectively swept by the gases. Therefore, instead of the former trapezium shape of combustion chamber, the combustion chamber, in longitudinal section, is now formed in the shape of a retort, at the highest point of which the burners are arranged and directed toward the curved front wall of the chamber. The introduction of pulverized fuel-air jets in this direction, together with the corresponding injection of combustion air along the front wall and behind the fuel-air jets, causes the flame to be deflected while the fuel and ash particles, as a result of centrifugal force, are driven onto the bottom of the combustion chamber and are there retained on the liquid slag film. The flame whirling in the front portion of the combustion chamber also makes the combustion chamber ceiling effective and thus supplements the effect of the deflection. Toward the gas outlet, at the opposite end, the cross section of the combustion chamber decreases, so that the rate of flow of the flue gases is considerably increased. Thus, by providing an upright baffle or boundary wall directly opposite the combustion chamber outlet, the discharging gas stream is abruptly deflected through an angle of about 90 degress whereby, as a result of the sudden change of direction, the particles suspended in the gas stream are unable to follow this change of direction and therefore are hurled against the wall where they adhere to the slag film thereon.

Repeated deflection of the gas stream, which results in a lengthening of the combustion path and is therefore especially favorable for relatively low volatile fuels, can further increase the proportion of ash particles retained by slag on the walls. It is also possible, by providing special supplementary burners, operated with a highly inflammable fuel if necessary, to separately heat that portion of the combustion chamber containing the slag discharge opening and thus prevent slag from solidifying therein at low operating loads.

To further improve the effect of the fluid cooled gas directing walls, it is advantageous to raise some of the tubes from the position of other tubes of these walls so as to form at the furnace side of the walls a series of parallel ribs causing additional eddies in the gas stream flowing thereover. It is especially effective to form in this manner the lateral walls of the furnace or, more generally, all combustion chamber walls of which the tubes extend crosswise to the direction of gas flow. The gas eddies produced by the projecting tubular ribs contribute considerably to the separation of ash particles from the marginal layers of the streams. The forming of parallel ribs and intermediate valleys as described for combustion chamber walls may similarly be applied at other locations to provide a favorable arrangement of air nozzles which in planar walls tend to slag over. For example, with air nozzles formed in a lower upright wall section, it is advisable to form the upper wall section with ribs and valleys as above described and to arrange the upper section so that it slopes downwardly to join the section containing the air nozzles. The slag flowing down the wall will then be confined to the valleys or trenches so that air nozzles having discharge outlets in the crests can therefore not be obstructed by the slag.

The various features of novelty which characterize this invention are pointed out with particularity in the claims annexed to and forming a part of this specification. For a better understanding of the invention, its operating advantages and specific objects attained by its use, reference should be had to the accompanying drawings and descriptive matter in which selected embodiments of the invention are illustrated and described.

Of the drawings:

Fig. 1 is a side elevational view, in section, of a vapor generating unit having a furnace according to one form of the invention;

Fig. 4 is an enlarged fragmentary reproduction of Fig. 2 embodying a modification in furnace wall construction;

Fig. 5 is an enlarged sectional view of the furnace wall structure featured in Fig. 4;

Fig. 6 is a vertical section of Fig. 5, taken along line 6—6;

Fig. 7 is a partial elevational view of Fig. 5 as seen along line 7—7 from the furnace side of the wall;

Fig. 8 is an enlarged partial sectional view of Fig. 2, for example, taken along line 8—8, and showing constructional features applicable to combustion chamber walls;

Figure 10:
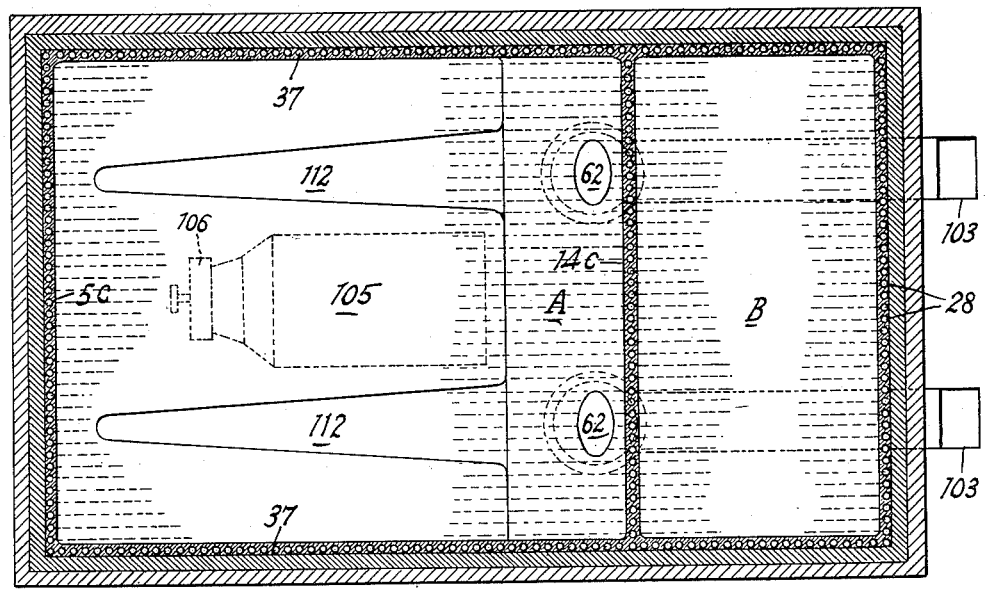
Figure 3:
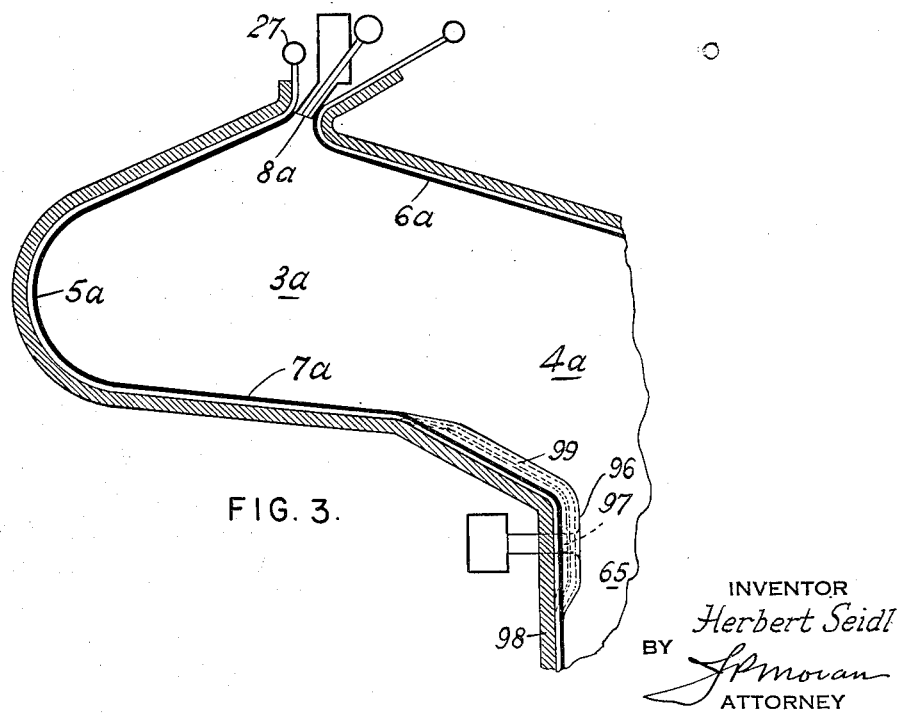

Fig. 9 is a side elevational view, in section, showing a further modification of boiler furnace; and Figs. 10 and 11 are vertical and horizontal sectional views of Fig. 9, taken along line 10—10 and line 11—11, respectively.

According to Fig. 1, the vapor generating unit therein illustrated includes as its firing means a fluid cooled furnace 2 of which the combustion chamber 3, in longitudinal section, is shaped in the manner of a retort so as to provide a progressively decreasing internal cross sectional area toward a gas outlet 4 at the inner end. The outer end wall 5 at the front of the chamber is of substantially circular curvature, concave toward the interior of the chamber, while upper and lower walls 6 and 7 are planar and arranged in downwardly inclined converging relation toward the gas outlet 4, the upper wall 6 being more steeply inclined than the lower wall 7. Opposing side walls are suitably arranged upright and parallel to define a chamber of substantially rectangular cross section, transversely of gas flow therethrough. A pulverized fuel-air mixture is injected through burners 8 into the uppermost portion of the combustion chamber, in the direction of the front wall 5, with additional air, as desired, from a secondary air conduit 9. At points 11 and 12, as indicated, air nozzles are preferably provided to form with the pulverized fuel jets a whirling flame in the front part of the combustion chamber. Due to the gradual decrease in cross section toward the gas outlet 4, the discharging gas stream is caused to impinge on an opposing upright baffle wall 14 at relatively high velocity and thereby deflected upwardly with an abrupt change of direction of about ninety degrees, the wall 14 forming part of the outer wall of an adjoining secondary chamber 15, as distinguished from the primary chamber 3. In an upper part of the baffle wall 14, as at point 16, the combustion air required for final combustion of the gases may advantageously be injected, suitably by means of horizontally spaced nozzles, as indicated. The upwardly flowing gases, after passing through a slag screen formed of tubes 17 which extend from a lower fluid inlet header 18 and continue along the front wall 19 to an upper drum 20, are caused to enter a radiant chamber 21, the walls of which are cooled on all sides, that is, the lateral walls by tubes 23 which in each such wall lead from a lower inlet header 24 to an upper header 25, the front wall 19 by additional tubes 26 which extend from a transverse furnace header 27 to the upper drum 20, and the rear wall by tubes 28 which extend between lower and upper headers 29 and 31, respectively. From header 31, tubes 32 extend upwardly along a forwardly projecting arch 34 and continue in the form of a screen forwardly of a radiant superheater 35, and thence to the upper drum 20. The front portion of header 24 is connected to an upper header 36 by upright tubes 37 which cool the front part of the combustion chamber side walls. The front wall 5 and bottom wall 7 of combustion chamber 3 are cooled by tubes 38 extending between upper and lower headers 27 and 39. Cooling tubes 41, for the ceiling 6, and which at the same time embrace a gas deflecting nose 42 formed above outlet 4, are preferably arranged as a section of the feed water preheater, since they are not adapted for connection into the natural circulation system of the boiler. Downcomer tubes between a front upper boiler drum 43 and the lower headers 18, 24, 29 and 39, as well as the riser tubes from upper header 25 to drum 20, are omitted from the drawing for simplification of illustration.

After passing in contact with the radiant superheater 35 and the convection superheater sections 45, 46, the flue gases enter the descending flue 47 in which are located the heating surfaces of a pre-evaporator 48, a tubular air heater 49, and a feed water preheater 51. The flue 47 is closed at the bottom by an ash collecting hopper 52. The flue gases pass laterally through the opening 53 into a duct 54, thence through a rotating regenerative air heater 56 from which the gases are discharged through outlet duct 57. A fan 58 blows the combustion air through the air heater 56, duct 59, air heater 49, and hot air main 61 from which the heated air may be directed to pulverizers, not shown, and/or to the several air nozzles hereinbefore mentioned.

The deflection of the flame along the front wall 5, with the flame whirl in the front part of combustion chamber 3, renders the combustion chamber walls highly useful for the binding of ash with the slag. This effect is supplemented by the upright baffle wall 14, beyond the chamber whereby there is effected a high degree of slag separation due to the abrupt change of direction of the furnace gases. The liquid slag, that is, the slag separated on the baffle wall 14, and that molten in the combustion chamber 3, flows through a slag outlet 62 formed in the bottom of chamber 20, and thence into a quenching tank, not shown, whence the slag is removed in a granulated state by suitable known means.

Figure 2:
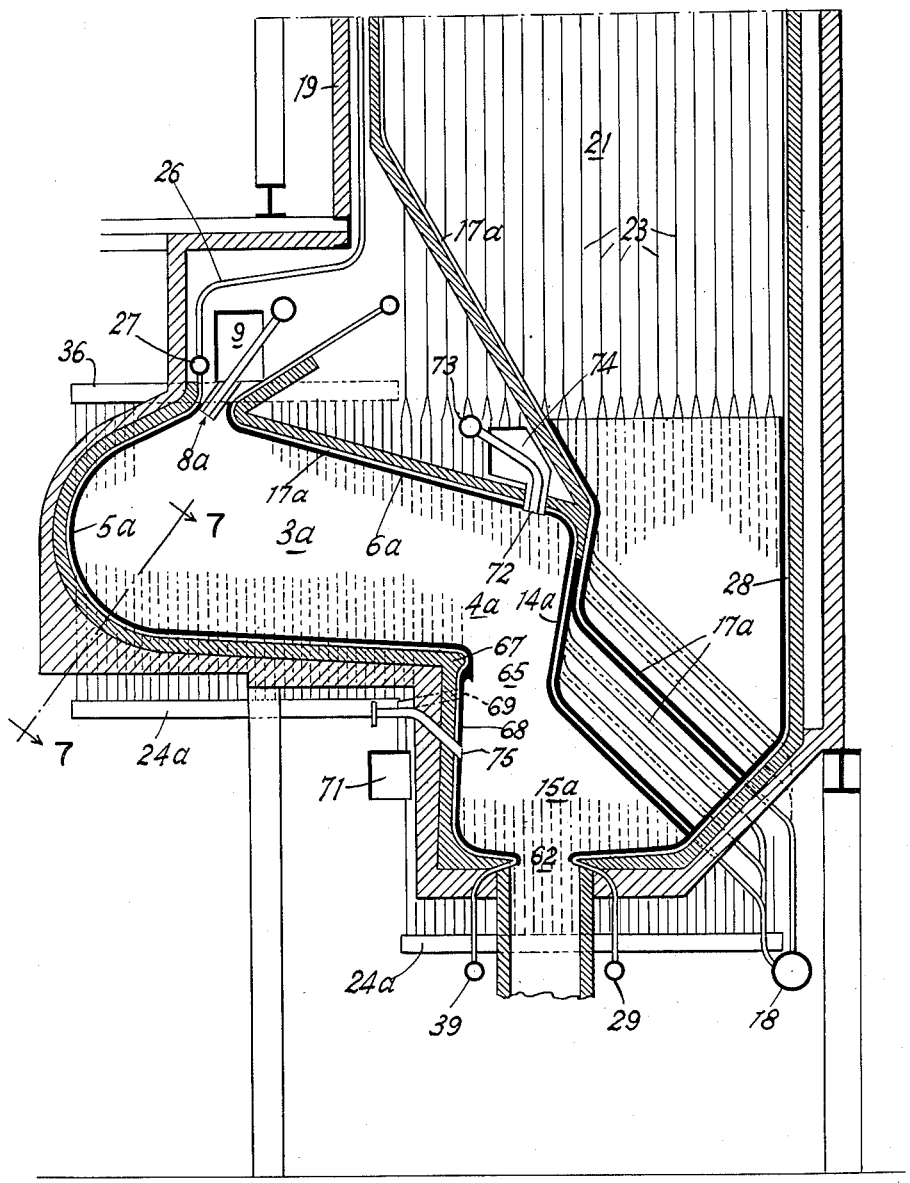
Fig. 2 is a sectional side view, in section, showing the lower part of a boiler unit embodying a modified form of furnace.

Fig. 2 shows a modified furnace construction also adapted for use in vapor generating units. In this embodiment, the combustion chamber 3a is of a form similar to chamber 3 shown in Fig. 1, with upper and lower walls 6a and 7a converging toward outlet 4a at a somewhat smaller angle. Other parts of substantially the same form and arrangement as in Fig. 1, are identified by reference characters used in Fig. 1, followed by "a" as for 3a and 4a above. In more detail, therefore, the furnace assembly of Fig. 2 includes a baffle wall 14a inclined downwardly and forwardly from the inner end of ceiling wall 6a and forming the inner wall of a vertical passage 65 through which gases are directed into the secondary chamber 15a at the bottom. The baffle wall 14a is defined by tubes of a slag screen 17a which lie across a passage through which gases are directed from the lower, secondary chamber 15a into the upper radiant chamber 21. Suitably, the slag screen tubes 17a are arranged in upper and lower groups, for natural circulation of fluid therethrough in parallel with other tubes of the unit, the tubes 17a of the upper group extending along the front wall 19 of radiant chamber 21, and tubes 17a of the lower group extending along the ceiling of combustion chamber 3a.

The inner end of the combustion chamber floor 7a is formed with a slag drip ledge 67 projecting into passage 65 beyond the front wall 68 which is inclined forwardly toward the bottom so as to further minimize the accumulation of slag thereon. The supply of supplemental air required for combustion is directed through air nozzles 69 horizontally spaced along wall 68 and opening into the passage 65 directly below the drip ledge 67, the nozzles receiving the air from a duct 71 to which heated air under pressure may suitably be supplied in known manner. In this form, instead of the single deflection of furnace gases, as in Fig. 1, the gases are twice deflected upon leaving the chamber 3a, firstly, by the upright baffle wall 14a, and secondly, by the bottom wall of chamber 15a, thereby resulting in a corresponding lengthening of the combustion path.

To maintain the slag liquid also at partial loads, there are arranged in the ceiling 6a of the combustion chamber 3a, directly in front of the baffle wall 14a, additional burners 72 which receive the pulverized fuel and primary air from duct 73, and the secondary air from duct 74. The nozzles of these burners extend parallel to the baffle wall 14a so that, in addition to supplementing the quantity of furnace gas developed in combustion chamber 3a, the burners 72 serve to heat the lower chamber region 15a and thus prevent slag from solidifying in and adjacent the bottom slag outlet 62. During protracted partial load periods it is advisable to use as fuel for the additional burners 72 one with favorable ignition properties, while for short partial load periods, the same fuel as for the main burners 2 may be used.

In the operation of slag tap furnaces generally it has been the practice to return to the combustion chamber fly ash separated from the flue gases, the fly ash being injected into the combustion chamber either through additional burners along with carrier air, or being returned to the pulverizers for injection with fuel through the main burners. In both cases, the fly ash imposes an additional load on the furnace. According to the present invention, therefore, it is proposed to introduce the separated fly ash directly into the lower furnace region 15a through inclined tubes 75 distributed along the front wall 68. In this case, the fly ash trickles downwardly into chamber 15a without the addition of any appreciable quantities of air, and thereafter is discharged with the molten slag through the bottom outlet 62. It is then not necessary that the fly ash be fused, since it suffices if, being allowed to sinter, the ash thus returned forms a mixture with the fused slag of the main furnace.

In each of the furnaces disclosed, the binding of ash with the slag which is based mainly on multiple deflection and baffle effect, can advantageously be supplemented by the formation of walls according to Fig. 8 which, by way of example, shows a furnace wall construction applicable to Fig. 2. As indicated in Fig. 8, in a furnace wall formed with a row of fluid conducting tubes 94, certain of the tubes 94a are raised inwardly from the remaining tubes 94 of the row, so that parallel ribs extending in the direction of the tubes are formed whereby, with the flue gases sweeping by in the direction of the arrows, a plurality of partial whirls are formed adjacent the respective ribs. The slag particles contained in the marginal layers of the gas stream are thus carried to the wall, to which they adhere. This arrangement, while especially effective when the direction of gas flow is crosswise to the tubes, is nevertheless advantageous also for baffle walls with tubes extending longitudinally of gas flow. The distances between the tubular ribs need not be uniform.

In upright planar walls of the furnaces illustrated, the air nozzles 16 (Fig. 1), and also the fly ash openings 75 in the front wall 68 of chamber 15a (Fig. 2), are subject to slagging because the slag flowing down along the wall is cooled by the injected air and thereby caused to solidify. As a result, the injection openings are covered in a short time by a slag curtain which deflects the air jets and makes them ineffective. For this reason it is proposed, according to the invention, to arrange the ribs which are provided in the combustion chamber walls to increase the binding effect, in such a way according to Fig. 6 that trenches 95 are formed in which the liquid slag is collected. The projecting crests 96 then remain free from slag and are therefore highly suitable for the provision of air nozzles 97 in an upright wall 98, as indicated in Figs. 4 to 7, for application to furnaces hereinbefore described, including a furnace of the arrangement shown in Fig. 2, as reproduced in part in Fig. 4. In order that liquid slag, in its downward flow along wall 98 at the elevation of nozzles 97, will be confined to the trenches 95, it is advisable to form the wall 98 so that its upper portion 99 above the nozzles is inclined rearwardly as indicated.

Figs. 9 to 11 show a further modification of fluid cooled boiler furnace in which the wedge shaped combustion chamber 3c is generally of the form illustrated in Fig. 2 and therefore identified by similar reference characters for corresponding elements of its construction. Thus, the outer end wall 5c is of substantially circular curvature, concave toward the interior of the chamber, with the upper and lower inclined walls 6c, 7c converging downwardly toward the inner outlet end, and with the upper wall or ceiling 6c formed as a curved arch between parallel upright side walls 10. Burners 8 are positioned at the uppermost part of the chamber, at intervals across its width, and directed toward the front wall 5c so as to effect a whirling movement of burning fuel within the front portion of the chamber. Secondary air from a duct 9 may be supplied at a location close to the burners, as shown, or at one or more other locations, the disposition of the secondary air nozzles being largely dependent on the gas content of the fuel to be fired.

The resulting slag bearing gases are discharged against a vertically positioned fluid cooled wall 14c which forms the inner end wall of chamber 3c and further serves as a baffle wall causing the discharging gases to be abruptly deflected downwardly through outlet passage 65c into the front space A of a secondary chamber 15c at the bottom of the setting where the gases are again deflected by the furnace floor 101 and caused to pass into the secondary chamber space B. The gases are further deflected by the rear furnace wall and thus directed into the upper radiation chamber 21. In this manner, the burning combustion gases are deflected three times at approximately a right angle, as a result of which the molten slag is extensively hurled out and collected on the floor of chamber 15c for continuous discharge through slag outlets 62. These repeated deflections also result in a turbulence of the gases whereby the combustion thereof is accelerated.

All walls of the furnace, as shown, are lined with cooling tubes suitably connected in known manner into the fluid circulation system of an upper boiler section, not shown; the tubes associated with the combustion chamber 3c, and the secondary chamber 15c, suitably being studded and lined on the furnace side with refractory material. Tubes 17, 23 and 28 which line the walls of radiation chamber 21 are preferably left bare, whereas the slag screen tubes 17 below chamber 21 are studded and refractory covered throughout. During the operation of the unit, with a given fuel and at a given capacity, gas temperatures within the combustion chamber 3c, and within the secondary chamber space B below slag screen 17, are approximately 1600° C. and 1350° C. respectively, both of which temperatures exceed the melting point of the fuel-slag which is here assumed to lie at about 1150° C.

Slag discharging through the bottom outlets 62 is directed through shafts 102, suitably into a quenching tank, not shown, with shafts 102 having walls suitably sealed in known manner against the intake of atmospheric air. In order to prevent the slag openings 62 from becoming blocked by slag, provision is made for heating the wall area surrounding each opening by regularly withdrawing hot furnace gases through the openings, suitably by means of a duct or ducts 103 having an inlet connection with the interior of each shaft 102. However, the amount of furnace gases thus withdrawn may represent a considerable proportion of the total available heating gases particularly when the composition of the slag is such as to make melting difficult. Therefore, in order that the heat content of the withdrawn furnace gases will not be lost, these gases are returned to the body of gases within the furnace at a location at which the gases still have to pass through a heat exchange zone of the unit. The duct 102 may, for example, discharge into the gas flue, not shown, through which the main gas stream is directed over successive heating surface groups, with the returned gases joining the main stream at a location between the groups.

In the front wall 68 of the secondary chamber 15c, there is provided a cyclone furnace 105 of a known type in which fly ash from the main furnace unit is to be burned either alone or with a suitable solid fuel such as coal, as use din the primary chamber 3c. The cyclone furnace may also be used for maintaining partial load operation when the main furnace 3c is shut down, or may be used as the ignition furnace for the latter. Fuel and air are introduced tangentially into a burner head 106 at the outer end, while secondary air is introduced in the same tangential direction through ports 107 at the maximum furnace diameter. The heating gases developed in cyclone furnace 105 are discharged through a central throat passage 108 into the secondary chamber space A, while the molten slag flows through a lower outlet 109 also into space A.

In chamber 3c, the liquid slag flows onto and along the inclined bottom 7c, and over the drip ledge 67c. However, to allow for operation with fuels providing a poorly flowing or sluggish slag, the combustion chamber floor 7c is formed with deep slag-drainage grooves or channels 112 of which the bottoms are steeply inclined and directed toward the furnace bottom 101 in the vicinity of the respective slag outlets 62. With the provision of grooves 112, as described, the combustion chamber bottom 7c may be made horizontal or made to slope downwardly in the opposite direction. A part of the combustion gases will stream through each of these slag outflow channels 112 and thus keep the slag liquid, while also heating the slag outlets 62. When a plurality of channels 112 are provided, they are advantageously disposed in such a way that each is directed toward a slag outlet 62, whereas the cyclone furnace outlet 108 is positioned between the channels. In order to accelerate combustion in gases discharging from the upper chamber 3c, inclined nozzles 114 are installed below the drip ledge 67c for directing tertiary air upwardly into the upper elbow portion of passage 65c.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of the invention may sometimes be used to advantage without a corresponding use of other features.

I claim:

1. Apparatus for burning slag-forming solid fuel which comprises a horizontally elongated combustion chamber defined by walls having an inner exposed refractory surface and fluid cooled tubes proportioned for the maintenance of a normal mean temperature in said combustion chamber above the fuel ash fusion temperature, said walls including downwardly inclined opposed upper and lower walls converging toward and cooperating to form a restricted gas and slag outlet at one end of said chamber for increasing the velocity of the slag-laden gases discharging therefrom and an outwardly curved end wall at the opposite end of said chamber extending from the upper to the lower wall, means for introducing combustion air and slag-forming solid fuel into said combustion chamber in a direction toward and in sweeping relation with said outwardly curved end wall to effect a path of travel along said lower wall and to form a fluid slag film on said end and lower walls, walls defining a vertically extending secondary furnace chamber arranged laterally adjacent to said combustion chamber and opening to said gas and slag outlet, said secondary furnace chamber including an upright wall opposite said gas and slag outlet arranged to receive the impact of the slag particles in suspension in the gases discharged from said combustion chamber, and means forming a slag outlet in the lower portion of said secondary furnace chamber for removing the molten slag separated from the gases flowing through said combustion and secondary furnace chambers.

2. Apparatus for burning slag-forming solid fuel which comprises a horizontally elongated combustion chamber of rectangular vertical cross-section defined by walls having an inner exposed refractory surface and fluid cooled tubes proportioned for the maintenance of a normal mean temperature in said combustion chamber above the fuel ash fusion temperature, said walls including downwardly inclined opposed upper and lower walls converging toward and cooperating to form a restricted gas and slag outlet at one end of said chamber for increasing the velocity of the slag-laden gases discharging therefrom and an outwardly curved end wall at the opposite end of said chamber extending from the upper to the lower wall, means including a series of nozzles opening into the upper portion of said combustion chamber for introducing combustion air and slag-forming solid fuel in a direction toward and in sweeping relation with said outwardly curved end wall to effect a path of travel along said lower wall and to form a fluid slag film on said end and lower walls, walls defining a vertically extending secondary furnace chamber arranged laterally adjacent to said combustion chamber and opening to said gas and slag outlet, said secondary furnace chamber including an upright wall opposite said gas and slag outlet arranged to receive the impact of the slag particles in suspension in the gases discharged from said combustion chamber, and means forming a slag outlet in the lower portion of said secondary furnace chamber for removing the molten slag separated from the gases flowing through said combustion and secondary furnace chambers.

3. Apparatus for burning slag-forming solid fuel which comprises a horizontally elongated combustion chamber of rectangular vertical cross-section defined by walls having an inner exposed refractory surface and fluid cooled tubes proportioned for the maintenance of a normal mean temperature in said combustion chamber above the fuel ash fusion temperature, said walls including downwardly inclined opposed upper and lower walls converging toward and cooperating to form a restricted gas and slag outlet at one end of said chamber for increasing the velocity of the slag-laden gases discharging therefrom and an outwardly curved end wall at the opposite end of said chamber extending from the upper to the lower wall, means including a series of nozzles arranged adjacent the junction of said upper and end walls for introducing combustion air and slag-forming solid fuel into said combustion chamber in a direction toward and in sweeping relation with said outwardly curved end wall to effect a path of travel along said lower wall and to form a fluid slag film on said end and lower walls, walls defining a vertically downwardly extending secondary furnace chamber arranged laterally adjacent to said combustion chamber and opening to said gas and slag outlet, said secondary furnace chamber including an upright wall opposite said gas and slag outlet arranged to receive the impact of the slag particles in suspension in the gases discharged from said combustion chamber, and means forming a slag outlet in the lower portion of said secondary furnace chamber for removing the molten slag separated from the gases flowing through said combustion and secondary furnace chambers.

4. Apparatus for burning slag-forming solid fuel which comprises a horizontally elongated combustion chamber defined by walls having an inner exposed refractory surface and fluid cooled tubes proportioned for the maintenance of a normal mean temperature in said combustion chamber above the fuel ash fusion temperature, said walls including downwardly inclined opposed upper and lower walls converging toward and cooperating to form a restricted gas and slag outlet at one end of said chamber for increasing the velocity of the slag-laden gases discharging therefrom and an outwardly curved end wall at the opposite end of said chamber extending from the upper to the lower wall, means for introducing combustion air and slag-forming solid fuel into said combustion chamber in a direction toward and in sweeping relation with said outwardly curved end wall to effect a path of travel along said lower wall and to form a fluid slag film on said end and lower walls, walls defining a vertically extending secondary furnace chamber arranged laterally adjacent to said combustion chamber and opening to said gas and slag outlet, said secondary furnace chamber including an upright wall opposite said gas and slag outlet arranged to receive the impact of the slag particles in suspension in the gases discharged from said combustion chamber, means forming a slag outlet in the lower portion of said secondary furnace chamber for removing the molten slag separated from the gases flowing through said combustion and secondary furnace chambers, and auxiliary burner means for introducing air and fuel into the upper portion of said secondary furnace chamber in a direction toward said slag outlet.

5. Apparatus for burning slag-forming solid fuel which comprises a horizontally elongated combustion chamber defined by walls having an inner exposed refractory surface and fluid cooled tubes proportioned for the maintenance of a normal mean temperature in said combustion chamber above the fuel ash fusion temperature, said walls including upright side walls, downwardly inclined opposed upper and lower walls converging toward and cooperating to form a restricted gas and slag outlet at one end of said chamber for increasing the velocity of the slag-laden gases discharging therefrom, and an outwardly curved end wall at the opposite end of said chamber extending from the upper to the lower wall and between said side walls, some of the fluid cooled tubes of said side walls being arranged in a common plane and the remainder being displaced along their lengths inwardly of said common plane thereby forming alternating crests and valleys along the innner side wall surfaces across the flow of gases through said combustion chamber, means for introducing combustion air and slag-forming solid fuel into the upper portion of said combustion chamber in a direction downwardly toward and in sweeping relation with said outwardly curved end wall to effect a path of travel along said lower wall and to form a fluid slag film on said end and lower walls, and walls defining a vertically extending secondary furnace chamber arranged laterally adjacent to said combustion chamber and opening to said gas and slag outlet.

6. Apparatus for burning slag-forming solid fuel which comprises a horizontally elongated combustion chamber defined by walls having an inner exposed refractory surface and fluid cooled tubes proportioned for the maintenance of a normal mean temperature in said combustion chamber above the fuel ash fusion temperature, said walls including downwardly inclined opposed upper and lower walls converging toward and cooperating to form a restricted gas and slag outlet at one end of said chamber for increasing the velocity of the slag-laden gases discharging therefrom and an end wall at the opposite end of said chamber extending from the upper to the lower wall, means for introducing combustion air and slag-forming solid fuel into said combustion chamber to form a fluid slag film on said lower wall, walls defining a vertically downwardly extending secondary furnace chamber arranged laterally adjacent to said combustion chamber and opening to said gas and slag outlet, said secondary furnace including an upright outer wall having fluid cooled tubes arranged to form alternating crests and valleys in horizontal succession along the inner face of the outer wall and nozzles arranged in the projecting crests for directing jets of air into the gases flowing through said secondary furnace chamber, and means forming a slag outlet in the lower portion of said secondary furnace chamber for removing the molten slag separated from the gases flowing through said combustion and secondary furnace chambers.

7. Apparatus for burning slag-forming solid fuel which comprises a horizontally elongated combustion chamber defined by walls having an inner exposed refractory surface and fluid cooled tubes proportioned for the maintenance of a normal mean temperature in said combustion chamber above the fuel ash fusion temperature, said walls including downwardly inclined opposed upper and lower walls converging toward and cooperating to form a restricted gas and slag outlet at one end of said chamber for increasing the velocity of the slag-laden gases discharging therefrom and an outwardly curved end wall at the opposite end of said chamber extending from the upper to the lower wall, means for introducing combustion air and slag-forming solid fuel into said combustion chamber in a direction toward and in sweeping relation with said outwardly curved end wall to form a fluid slag film thereon, walls defining a vertically extending secondary furnace chamber arranged laterally adjacent to said combustion chamber and opening to said gas and slag outlet, said secondary furnace chamber including an upright inner wall opposite said gas and slag outlet arranged to receive the impact of the slag particles in suspension in the gases discharged from said combustion chamber, said secondary furnace chamber including an upright inner wall having fuel firing means associated therewith arranged to discharge gases in impacting relationship with said upright outer wall, and means forming a slag outlet in the lower portion of said secondary furnace chamber for removing the molten slag separated from the gases flowing through said combustion and secondary furnace chambers.

8. Fuel burning apparatus as defined in claim 7 and further including means for withdrawing hot furnace gases through said secondary furnace chamber slag outlet.

9. Fuel burning apparatus as defined in claim 7 wherein the lower wall of said combustion chamber is formed with a slag-drainage groove of which the bottom is steeply inclined and directed into the lower portion of said secondary chamber.

10. Fuel burning apparats as defined in claim 7 wherein said fuel firing means associated with said upright outer wall is formed as a cyclone furnace arranged to discharge heating gases at one elevation and to separately discharge slag at a lower elevation.

References Cited in the file of this patent
UNITED STATES PATENTS

| | | |
|---|---|---|
| 1,307,364 | Kinyon | June 24, 1919 |
| 1,701,836 | Cannon et al. | Feb. 12, 1929 |
| 1,780,220 | Baumgartner | Nov. 4, 1930 |
| 2,231,872 | Bailey et al. | Feb. 18, 1941 |
| 2,294,977 | Garrison et al. | Sept. 8, 1942 |
| 2,570,073 | Reintjes | Oct. 2, 1951 |
| 2,594,312 | Kerr et al. | Apr. 29, 1952 |
| 2,654,350 | Fitzpatrick | Oct. 6, 1953 |

FOREIGN PATENTS

| | | |
|---|---|---|
| 697,836 | France | Nov. 5, 1930 |
| 539,455 | Germany | Nov. 30, 1931 |